(12) United States Patent
Robinson

(10) Patent No.: US 12,458,477 B1
(45) Date of Patent: Nov. 4, 2025

(54) HAND HELD AUTOMATIC DENTAL FLOSSER

(71) Applicant: Dyke Noel Robinson, Katy, TX (US)

(72) Inventor: Dyke Noel Robinson, Katy, TX (US)

( * ) Notice: Subject to any disclaimer, the term of this patent is extended or adjusted under 35 U.S.C. 154(b) by 263 days.

(21) Appl. No.: 17/726,903

(22) Filed: Apr. 22, 2022

Related U.S. Application Data

(60) Provisional application No. 63/178,519, filed on Apr. 22, 2021.

(51) Int. Cl.
*A61C 15/04* (2006.01)
*A61C 17/34* (2006.01)

(52) U.S. Cl.
CPC ............ *A61C 15/046* (2013.01); *A61C 17/34* (2013.01); *A61C 2204/002* (2013.01)

(58) Field of Classification Search
CPC .......... A61C 15/046–048; A61C 17/34; A61C 2204/002
USPC ........................................................ 433/103
See application file for complete search history.

(56) References Cited

U.S. PATENT DOCUMENTS

| | | | | |
|---|---|---|---|---|
| 4,326,549 A * | 4/1982 | Hinding | ................ | A61C 15/047 132/322 |
| 5,016,660 A * | 5/1991 | Boggs | ................... | A61C 15/047 132/322 |
| 5,217,031 A * | 6/1993 | Santoro | ................ | A61C 15/047 132/322 |
| 6,526,994 B1 * | 3/2003 | Santoro | ................ | A61C 15/047 132/322 |
| 10,039,624 B2 * | 8/2018 | Lam | ...................... | A61C 15/046 |
| D1,009,371 S * | 12/2023 | Robinson | ....................... | D28/68 |
| 2002/0178519 A1 * | 12/2002 | Zarlengo | ............ | A61C 17/3445 132/309 |
| 2007/0000515 A1 * | 1/2007 | Yang | .................... | A61C 15/047 132/322 |
| 2007/0204878 A1 * | 9/2007 | Apotheker | ........... | A61C 15/048 132/322 |
| 2008/0029122 A1 * | 2/2008 | Egeresi | ................ | A61C 15/047 132/322 |
| 2010/0139689 A1 * | 6/2010 | Couch | .................. | A61C 15/047 132/325 |
| 2013/0186427 A1 * | 7/2013 | Monicelli | ............ | A61C 15/047 132/322 |
| 2014/0261511 A1 * | 9/2014 | Nibbe | ................... | A61C 15/046 132/200 |
| 2016/0192770 A1 * | 7/2016 | Trent | ..................... | A46B 17/04 132/309 |
| 2019/0110874 A1 * | 4/2019 | Kim | ..................... | A61C 15/046 |

(Continued)

FOREIGN PATENT DOCUMENTS

| | | | |
|---|---|---|---|
| CN | 107280793 A * | 10/2017 | ........... A61C 15/047 |
| GB | 2477271 A * | 8/2011 | ........... A61C 15/047 |

(Continued)

*Primary Examiner* — Matthew M Nelson
(74) *Attorney, Agent, or Firm* — Karen B. Tripp

(57) ABSTRACT

Automatic dental flosser having a handle having a battery-operated motor therein in communication with a "U" shaped head through a flexible tube. The head comprises floss and movers or directors for moving dental floss directionally across the top of the "U" shaped head for flossing when positioned between teeth or adjacent a tooth and a gum. The head is removable and disposable for floss replacement.

11 Claims, 6 Drawing Sheets

(56) References Cited

U.S. PATENT DOCUMENTS

2021/0259816 A1* 8/2021 Bushman ............. A61C 15/046
2022/0087798 A1* 3/2022 Ritz ...................... A46B 13/02

FOREIGN PATENT DOCUMENTS

KR          1812312 B1 * 12/2017  ........... A61C 15/047
WO    WO-0044302 A1 *  8/2000  ........... A61C 15/047

* cited by examiner

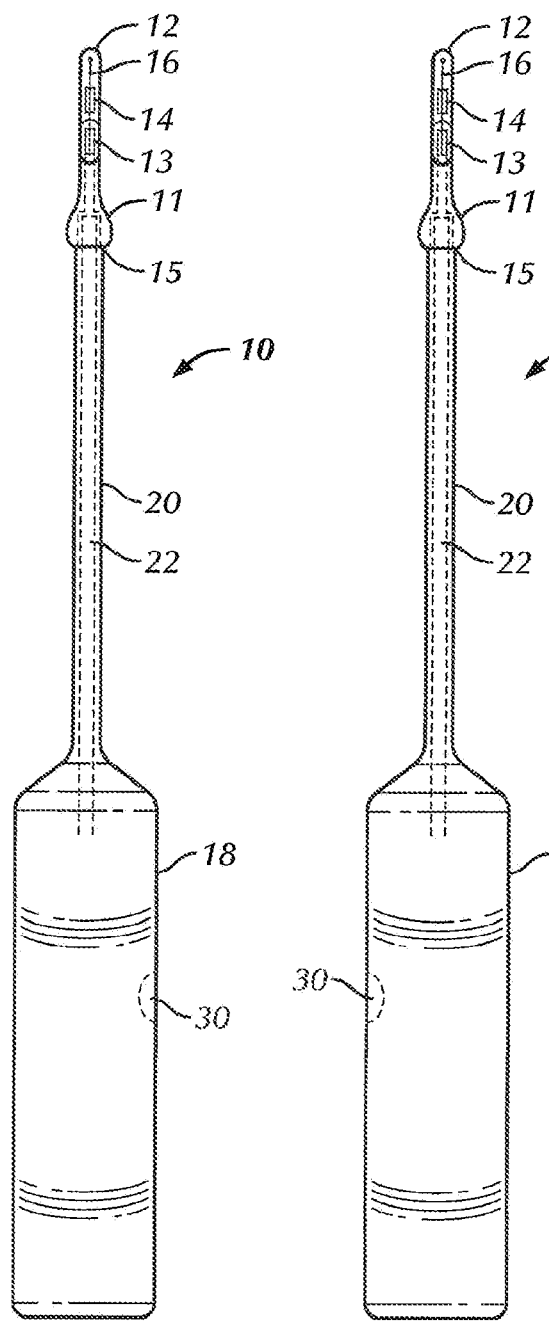
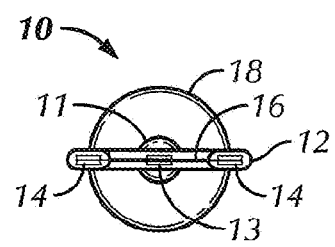
*FIG. 13*
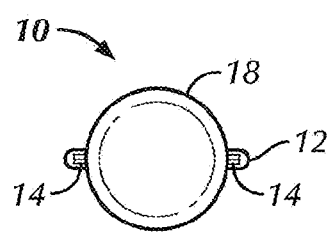
*FIG. 14*
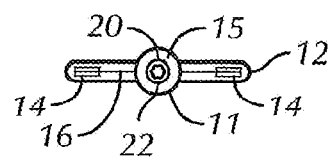
*FIG. 16*
*FIG. 11*  *FIG. 12*

HAND HELD AUTOMATIC DENTAL FLOSSER

RELATED APPLICATIONS

This application claims the benefit of U.S. Provisional Patent Application Ser. No. 63/178,519, filed Apr. 22, 2021, and entitled "Hand Held Automatic Dental Flosser," pending, which is incorporated herein by reference in its entirety, and U.S. Design patent application Ser. No. 29/778,793, filed Apr. 15, 2021, entitled "Hand Held Automatic Dental Flosser," pending, which is incorporated herein by reference in its entirety.

FIELD OF THE INVENTION

The present invention relates to automatic dental flossers for the flossing of teeth.

BACKGROUND OF THE INVENTION

Medical researchers have now recognized that there is a synergic relationship between persons' oral health and their overall wellness. Gum disease has been linked to a host of illnesses including heart disease, diabetes, respiratory disease, osteoporosis, and rheumatoid arthritis. Thus, the importance of good oral hygiene is increasingly appreciated.

However, it is also recognized that good oral hygiene involves more than merely brushing one's teeth. Good oral hygiene also involves regular flossing. Flossing helps remove not only food from between teeth, but also plaque and bacteria. Further, flossing is known to reduce the likelihood of tooth decay and gum disease.

While often flossing is done by hand with dental floss or tape, water flossers are also known. Water flossers use water and pressure to remove plaque and food from in between teeth. Another option is to use disposable floss picks. Floss picks are also used by hand, but the pick holds the floss instead of a person's fingers, and can help a person reach harder-to-reach teeth in the back of the mouth. Flossing correctly is as important as flossing, and tools that facilitate flossing better are always appreciated.

SUMMARY OF THE INVENTION

The present invention provides an automatic or electric flosser for flossing teeth. The flosser is operated or energized by one or more batteries (rechargeable or not) and/or an electrical cord plugged into an electrical outlet. The flosser has a handle for ease in use, with a flexible tube extending therefrom, which ends in a head that holds floss. The handle comprises a housing for containing a motor and electrical connection to an electrical cord and/or one or more batteries for operating the motor. That electrical connection also communicates through the flexible tube to the head of the flosser for energizing the head of the flosser. The head has a "U" shape design, with the floss extending across the top of the "U" and then circling through (and/or around) the head. Small moving directors or guides such as wheels in the head facilitate directional movement or flow of the floss when the flosser is activated, to enable an automatic flossing experience.

In one embodiment, the speed of movement of the floss can be varied or controlled. In one embodiment, such controls are in the handle of the flosser and communicated to the head through the flexible tube. In one embodiment, the head of the flosser is disposable and changeable, so that new or fresh floss may be obtained for use with the flosser by changing out the floss head. In another embodiment, the floss itself can be removed and replaced in the head.

BRIEF DESCRIPTION OF THE DRAWINGS

The invention can best be understood from the description below by referring to the drawings where:

FIG. 11 is a left side view of the hand held automatic dental flosser of FIG. 8;

FIG. 12 is a right side view of the hand held automatic dental flosser of FIG. 8;

FIG. 13 is a top view of the hand held automatic dental flosser of FIG. 8;

FIG. 14 is a bottom view of the hand held automatic dental flosser of FIG. 8.

FIG. 16 is a bottom view of the head of the dental flosser of FIG. 15, turned ninety degrees, to show the appearance of the end of the head that adjoins the flex tube of the handle of the dental flosser (not shown in this view).

DESCRIPTION OF PREFERRED EMBODIMENTS OF THE INVENTION

The present invention provides an apparatus or device for flossing teeth. The apparatus is automated, and receives power through a chargeable or replaceable battery (or batteries) or through an electrical cord attached to a wall outlet. The apparatus can also be adapted to be able to operate either from a battery or an electrical cord as the user selects. In one embodiment, the apparatus can sit on a charger and charge a battery within the apparatus while the charger is connected to an electrical outlet through an electrical cord.

Figure 1:
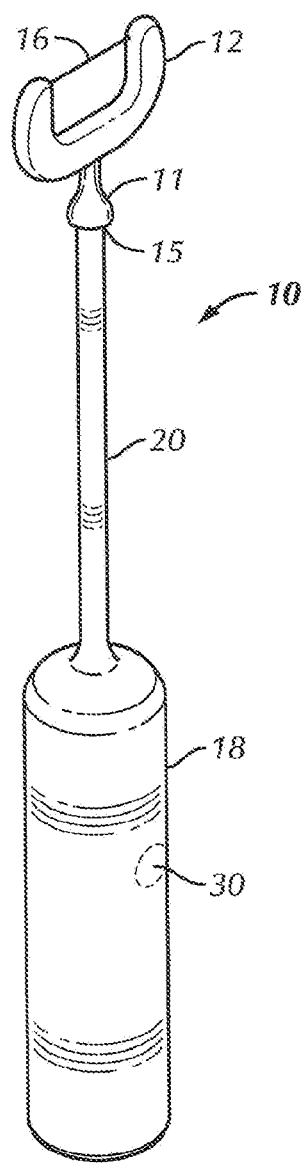
FIG. 1 is a front perspective view of a first embodiment of a hand held automatic dental flosser of the present invention.
Figure 1A:
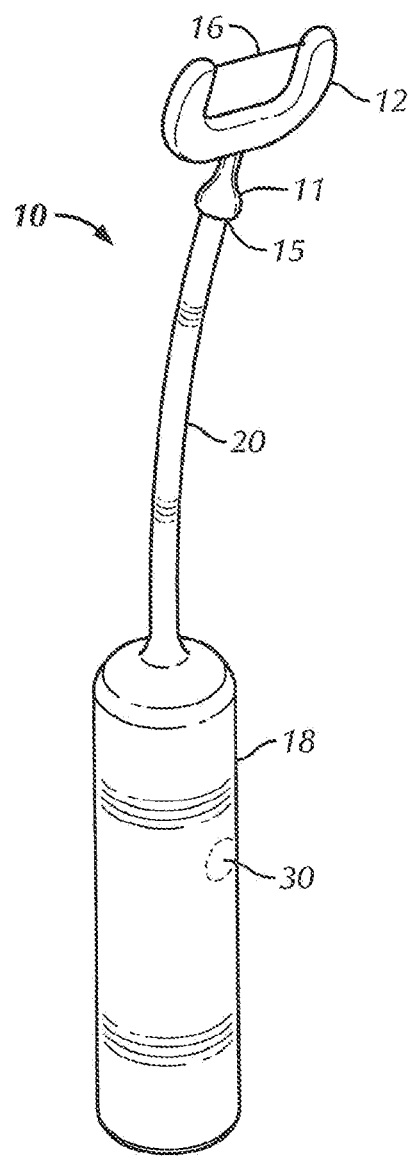
FIG. 1A is another front perspective view of the hand held automatic dental flosser of FIG. 1 shown in a flexed position.
Figures 2, 3:
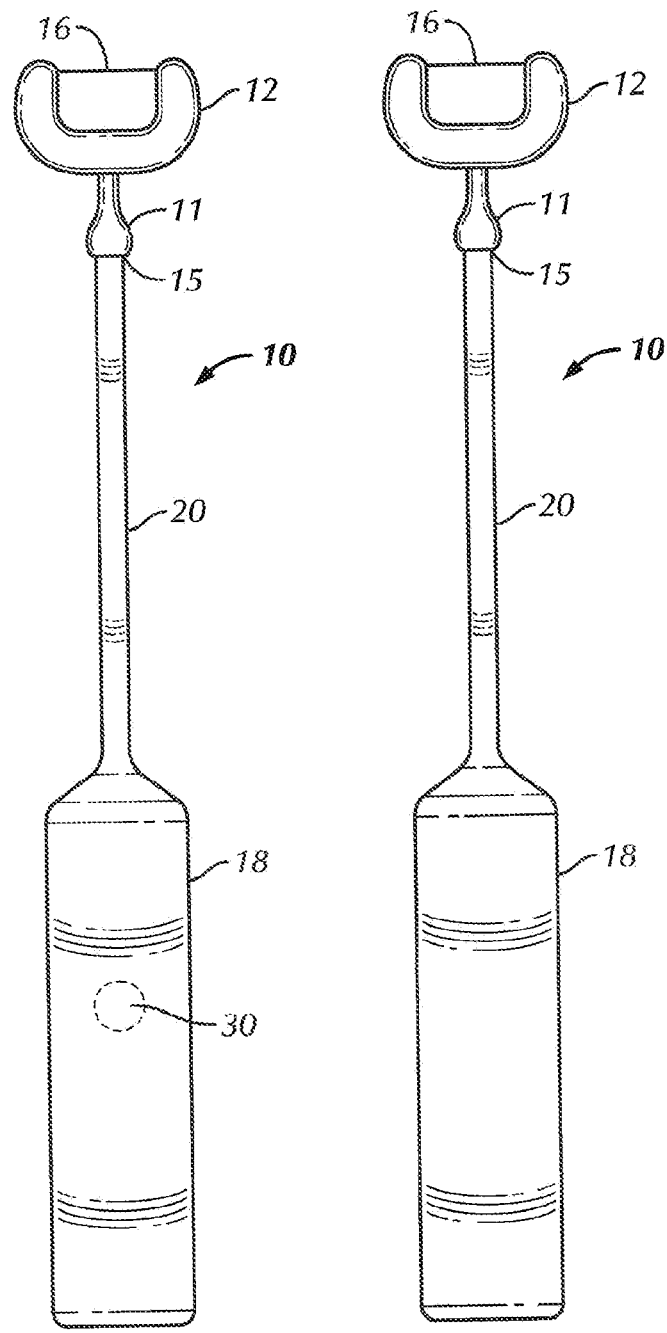
FIG. 2 is a front view of the hand held automatic dental flosser of FIG. 1.
FIG. 3 is a back view of the hand held automatic dental flosser of FIG. 1.
Figures 4, 5, 6, 7:
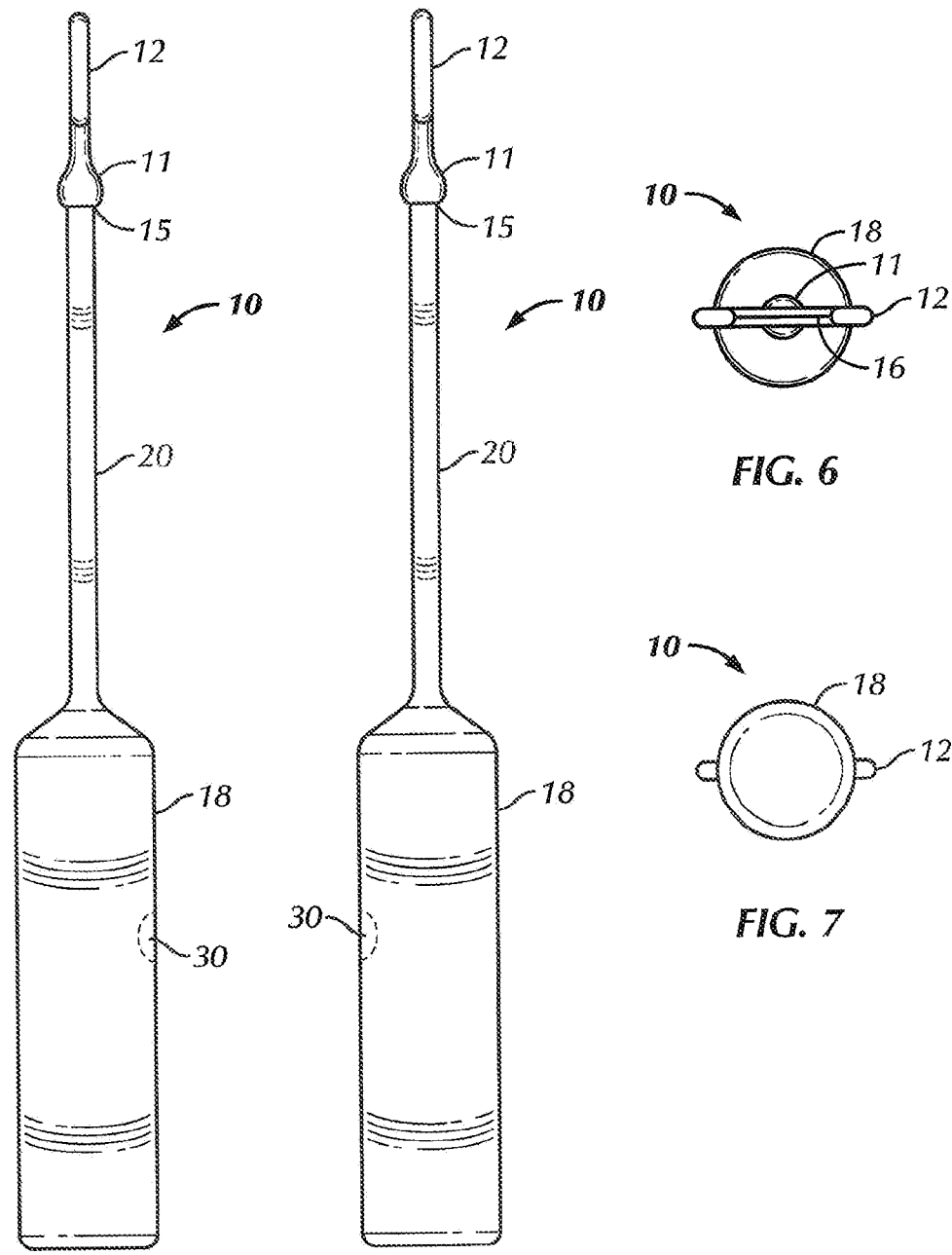
FIG. 4 is a left side view of the hand held automatic dental flosser of FIG. 1.
FIG. 5 is a right side view of the hand held automatic dental flosser of FIG. 1.
FIG. 6 is a top view of the hand held automatic dental flosser of FIG. 1.
FIG. 7 is a bottom view of the hand held automatic dental flosser of FIG. 1.
Figures 8, 9, 10:
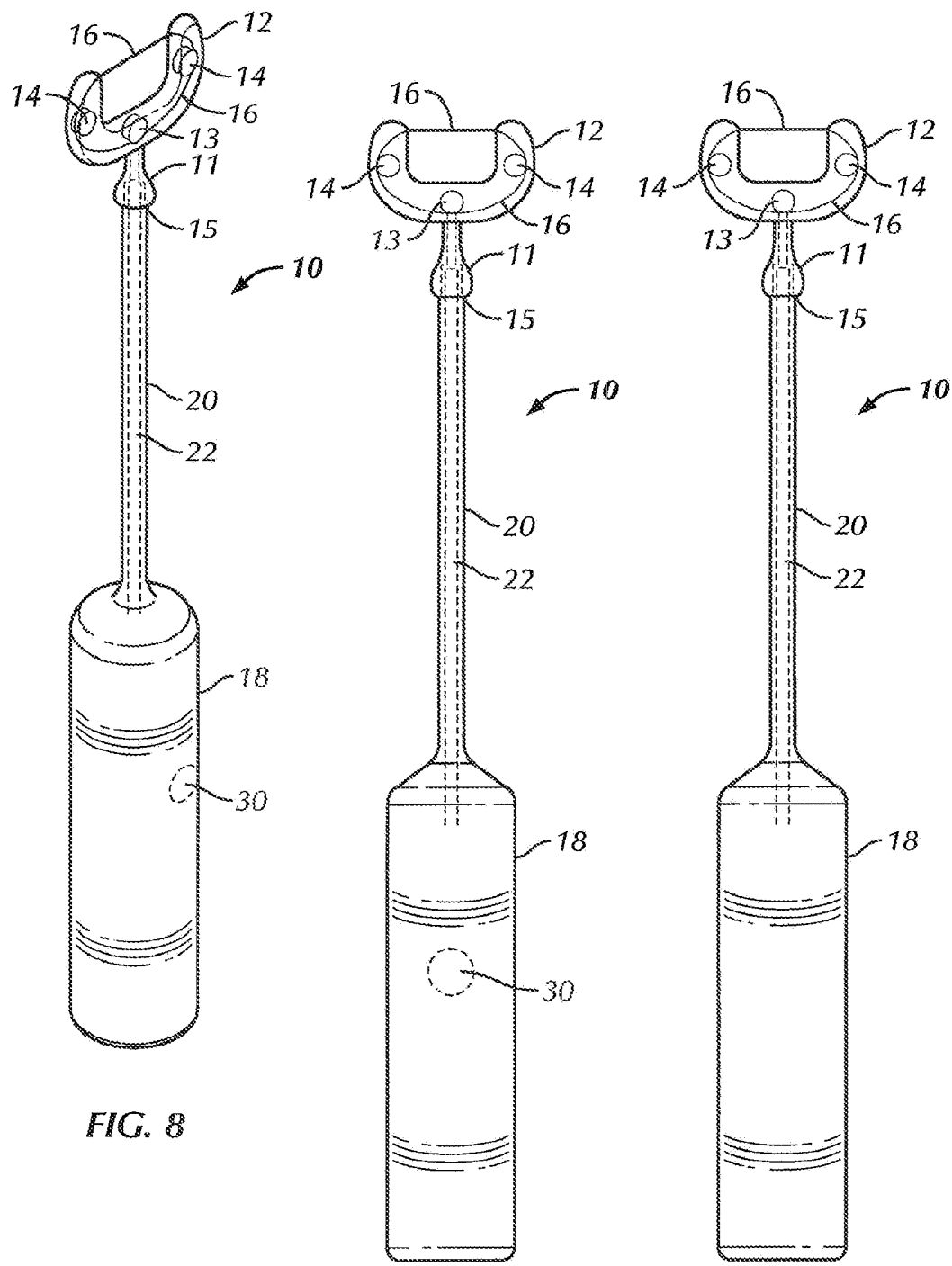
FIG. 8 is a front perspective view of a second embodiment of a hand held automatic dental flosser of the present invention.
FIG. 9 is a front view of the hand held automatic dental flosser of FIG. 8.
FIG. 10 is a back view of the hand held automatic dental flosser of FIG. 8.
Figure 15:
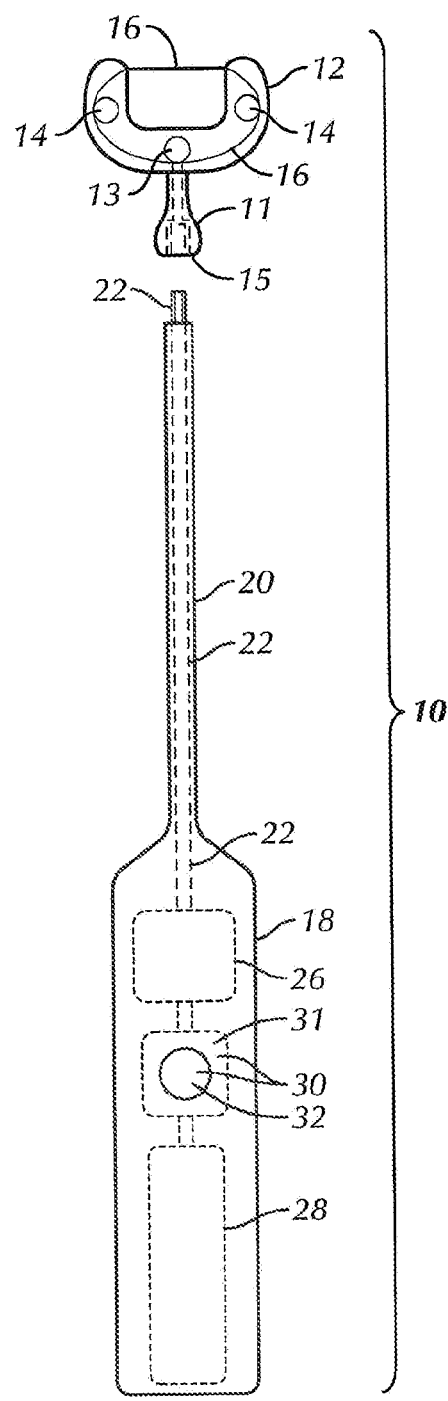
FIG. 15 is a "blown up" depiction of the hand held automatic dental flosser of FIG. 8, with the outer housing cut-away to show internal workings of the dental flosser.

Through such automation, and referring to one embodiment of the apparatus illustrated in the Figures, floss 16 on the head 12 of the apparatus 10 moves around the head 12 as shown in FIG. 15 so a user can simply hold the apparatus 10 such that floss 16 is positioned between two teeth or between a tooth (such as a back tooth) and adjacent gum and the automated movement of the floss 16 around the head 12 does the flossing. When the floss 16 needs replacing, the head 12 may be removed and replaced with a new or replacement head 12 containing new floss 16. As shown in FIG. 15, the head 12 can be removed and replaced through squeezing a squeeze-release mechanism 11 at the base 15 of the head 12, where the head 12 connects to the main body 18 of the apparatus 10. Such connection is facilitated through a rod 22 that can be of various shapes, such as hexagonal (shown) or octagonal or round or square or oval or pentagonal or any other of a variety of shapes. In an alternative embodiment, the head 12 can be adapted to accept replacement floss 16, in lieu of replacing the entire head 12 for replacing floss 16.

As shown in FIGS. 1-7, the head 12 can be comprised of a solid material such as opaque plastic or stainless steel, or as shown in FIGS. 8-15, the head 12 can be comprised of a clear or transparent plastic. In one embodiment, wheels 14 in the head 12, including a drive wheel 13, as shown in FIGS. 8-15, turn or move the floss 16 around or in a pathway about the head 12 during operation of the apparatus 10 for flossing teeth.

In the embodiment of the apparatus shown in FIG. 15, the main body 18 of the apparatus 10, to which the head 12 of the flosser apparatus 10 of the invention attached, comprises a housing 19 or base, which can serve as a handle, with a flexible tube 20 extending therefrom containing a rod 22 for containing within it the electrical connection between the battery 28 or electrical source to the motor 26 within the housing 19 to the head 12 for operation of the head 12 and specifically for turning the wheels 14 for moving the dental floss 16 for flossing teeth. The flexible tube 20 facilitates easier manipulation of the apparatus 10, and particularly the head 12 of the apparatus 10, in the mouth of the user for reaching and flossing different individual teeth.

That is, the flexible tube 20 extends into or connects to the housing 19 or base or handle that contains the motor 26 and a battery 28 and controls 30, which can include electronics 31 and a mode button 32, for turning the apparatus on and off. The controls 30 in some embodiments can have different speeds for operation, such as for example a high speed, a moderate speed, and a low speed for moving the floss around or about in the head 12 during flossing.

In one embodiment, referring to FIG. 15, for operation of the apparatus 10, the mode button 32 is pressed to cause internal electronics 31 including a motor controller to send an electrical signal to activate the motor 26 at the desired speed (programed in the internal electronics 31). The motor 26 can include a drive motor which in turn communicates with a drive shaft sending an electrical signal through the flexible rod 22 in the flexible tube 20 to the removable head 12 including the wheels 14 and 13 which then turn and cause the floss 16 to move directionally across the top of the "U" shaped head 12. That is, the flexible drive shaft translates rotational torque through the housing body and the end of this flexible drive shaft connects to the head 12 at the base 15 of the head 12. Thus in this embodiment, motor 26 turns a 90-degree gearbox to drive wheels 13 and 14 having grooves which hold floss 16, acting as v-groove pulleys, in the head 12. As the wheels 13 and 14 (acting as pulleys) spin or turn, floss 16 continuously loops around the head 12 as in, or mimicking, a belt driven mechanism. This continuous floss loop motion along the wheels (acting as pulleys) creates the desired flossing effect.

Although preferred embodiments of the present invention have been described, various changes, adaptations and modifications can be made without departing from the spirit of the invention, as claimed.

What is claimed is:

1. An automatic dental flosser comprising:
    a handle or housing having therein a motor and power source for said motor;
    a head comprising floss and a drive wheel for directionally moving the floss about the head to effect a flossing action when the floss is positioned between teeth or adjacent a tooth and a gum;
    a flexible tube comprising a drive shaft in communication with said motor which translates rotational torque to said head to cause said drive wheel in said head to turn and said floss to move.

2. The automatic dental flosser of claim 1 wherein the head is "U" shaped and the floss moves directionally across the top of said "U" shape to effect said flossing action.

3. The automatic dental flosser of claim 1 wherein the head is removable and disposable.

4. The automatic dental flosser of claim 1 wherein said power source is at least one battery.

5. The automatic dental flosser of claim 4 wherein said at least one battery is rechargeable.

6. The automatic dental flosser of claim 1 wherein said power source comprises an electrical cord.

7. The automatic dental flosser of claim 1 further comprising at least one additional wheel in the head for moving said floss.

8. The automatic dental flosser of claim 7 wherein said flexible tube contains a rod for transmission of said rotational torque to the wheels in the head.

9. The automatic dental flosser of claim 1 wherein said handle has controls thereon associated with said motor therein and said motor through said controls can be adjusted or moderated to alter the speed of the movement of said floss in the head.

10. The automatic dental flosser of claim 8 wherein said speed has at least two variations.

11. An automatic dental flosser comprising:
    a head comprising floss and a drive wheel and at least one additional wheel for directionally moving the floss about the head to effect a flossing action when the floss is positioned between teeth or adjacent a tooth and a gum;
    a handle or housing having therein a motor and power source;
    a flexible tube comprising a flexible rod connecting the motor in the handle to the head to cause said drive wheel to turn by rotational torque and said floss to move.

\* \* \* \* \*